United States Patent
Hayakawa et al.

(10) Patent No.: US 12,221,171 B2
(45) Date of Patent: Feb. 11, 2025

(54) VEHICLE BODY REAR PORTION STRUCTURE

(71) Applicant: HONDA MOTOR CO., LTD., Tokyo (JP)

(72) Inventors: Hirotaka Hayakawa, Tokyo (JP); Takashi Nitta, Tokyo (JP); Toshihiro Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 318 days.

(21) Appl. No.: 17/860,122

(22) Filed: Jul. 8, 2022

(65) Prior Publication Data
US 2023/0015322 A1 Jan. 19, 2023

(30) Foreign Application Priority Data

Jul. 15, 2021 (JP) .................................. 2021-117084

(51) Int. Cl.
*B62D 43/10* (2006.01)
*B60K 15/063* (2006.01)

(52) U.S. Cl.
CPC ............ *B62D 43/10* (2013.01); *B60K 15/063* (2013.01)

(58) Field of Classification Search
CPC ................ B62D 43/10; B62D 25/2027; B60R 2021/0011; B60K 2015/0634; B60K 2015/0638; B60K 2015/0633
USPC ... 296/37.2, 188, FOR. 112, 187.11, 193.08, 296/203.04
See application file for complete search history.

(56) References Cited

U.S. PATENT DOCUMENTS

| | | | | |
|---|---|---|---|---|
| 2002/0185881 A1* | 12/2002 | Kosuge | .................. | B62D 43/10 296/37.2 |
| 2009/0195032 A1* | 8/2009 | Yamaguchi | ........ | B62D 25/2027 296/203.04 |
| 2010/0052368 A1* | 3/2010 | Yamaguchi | .......... | B62D 25/087 296/203.04 |
| 2010/0301637 A1* | 12/2010 | Matsuura | ............. | B62D 25/087 296/204 |
| 2011/0215617 A1* | 9/2011 | Izutsu | .................. | B62D 21/152 296/203.04 |
| 2013/0049394 A1* | 2/2013 | Urano | .................... | B62D 43/08 296/193.07 |
| 2017/0029046 A1* | 2/2017 | Shimpo | ................ | B62D 21/152 |

FOREIGN PATENT DOCUMENTS

| | | | |
|---|---|---|---|
| JP | 2004058696 A | * | 2/2004 |
| JP | 2016-020190 | | 2/2016 |
| JP | 2016078658 A | * | 5/2016 |

* cited by examiner

*Primary Examiner* — Amy R Weisberg
*Assistant Examiner* — Denise L. Esquivel
(74) *Attorney, Agent, or Firm* — Amin, Turocy & Watson, LLP

(57) ABSTRACT

A vehicle body rear portion includes a vehicle body floor and a fuel tank. The vehicle body floor has a tire storage area that is hollowed downward. The fuel tank is supported by a lower surface of the vehicle body floor on a forward side of the tire storage area. A stiffener is attached to the vehicle body floor at a forward position of the tire storage area. The stiffener extends along a vehicle body forward/rearward direction and reinforces an upper region of the fuel tank of the vehicle body floor.

11 Claims, 7 Drawing Sheets

VEHICLE BODY REAR PORTION STRUCTURE

CROSS-REFERENCE TO RELATED APPLICATION

Priority is claimed on Japanese Patent Application No. 2021-117084, filed on Jul. 15, 2021, the contents of which are incorporated herein by reference.

BACKGROUND

Field of the Invention

The present invention relates to a vehicle body rear portion structure in which a tire storage area is provided on a rear portion of a vehicle body floor.

Background

In recent years, a large number of vehicles have been produced in which a fuel tank is mounted at a lower position of a rear seat below a vehicle body floor.

Further, in this type of vehicle, such a vehicle is known in which a tire pan is provided at a rear portion of the vehicle body floor. In the tire pan, the tire storage area is formed to be hollowed downward at a rear position of an arrangement portion of the fuel tank, and a spare tire is stored in the tire storage area. A bottom portion of the tire storage area is at a height at which the bottom portion is partially overlapped in an upward/downward direction with the fuel tank below the vehicle body floor.

In this type of vehicle, there is a concern that, when an impact load is input from a vehicle rearward direction, the tire pan is deformed to a vehicle body forward side, and the spare tire which is a heavy object stored in the tire pan moves to a direction of the fuel tank. As a countermeasure, a vehicle body rear portion structure has been proposed in which a cross member that extends along a vehicle width direction is arranged between the fuel tank and the tire storage area of the tire pan, and a forward movement of the spare tire is regulated by the cross member (for example, refer to Japanese Unexamined Patent Application, First Publication No. 2016-20190).

SUMMARY

However, since the vehicle body rear portion structure described above regulates the forward movement of the spare tire by the cross member, which is a large structural member, it may be impossible to arrange a large cross member between the fuel tank and the tire storage area due to the arrangement relationship with another member or the like depending on the vehicle. Therefore, a vehicle body rear portion structure is desirable that can prevent the movement of the spare tire in the fuel tank direction at input of an impact load without using a cross member, which is a large structural component.

An aspect of the present invention provides a vehicle body rear portion structure capable of preventing the movement of a spare tire in a fuel tank direction at input of an impact load while being simple in structure and not occupying a large space.

A vehicle body rear portion structure according to an aspect of the present invention includes: a vehicle body floor having a tire storage area that is hollowed downward in a recess shape; and a fuel tank that is supported by a lower surface of the vehicle body floor on a forward side of the tire storage area, wherein a stiffener that extends along a vehicle body forward/rearward direction and reinforces an upper region of the fuel tank of the vehicle body floor is attached to the vehicle body floor at a forward position of the tire storage area.

According to the above configuration, the upper region of the fuel tank of the vehicle body floor is reinforced by the stiffener that extends along the vehicle body forward/rearward direction. Thereby, the rigidity in the vehicle body forward/rearward direction of the upper region of the fuel tank of the vehicle body floor is enhanced. As a result, when the impact load is input from the vehicle rearward direction, deformation of the upper region of the fuel tank of the vehicle body floor is prevented, and the movement in the fuel tank direction of the spare tire is also prevented. A rear end of the stiffener may extend to a vehicle body rearward position beyond a rear end of the fuel tank.

In this case, since a reinforcement portion of the vehicle body floor by the stiffener extends to the vehicle body rearward side beyond the rear end of the fuel tank, when the impact load is input from the vehicle rearward direction, deformation of the vehicle body floor at a rear end upper portion of the fuel tank can be prevented by the stiffener. Accordingly, when the present configuration is employed, it is possible to further reliably prevent a load from acting on the fuel tank at input of the impact load from the vehicle rearward direction.

The vehicle body floor may include: a tire pan having the tire storage area; and a rear floor panel that extends forward from a front portion of the tire pan, a front end of the tire pan and a rear end of the rear floor panel may be joined to each other, and the rear end of the stiffener may be joined to a joint portion of the tire pan and the rear floor panel.

In this case, since the rear end of the stiffener is joined to the joint portion of the tire pan and the rear floor panel, the rigidity of the joint portion of the tire pan and the rear floor panel can be enhanced by the stiffener, and the impact load that is input through the tire pan can be efficiently dispersed and supported by the stiffener. Thereby, it is possible to prevent concentration of stress on the joint portion of the tire pan and the rear floor panel when the impact load is input from the vehicle rearward direction and prevent forward displacement of the tire pan due to large deformation of the joint portion.

A piping insertion hole through which a piping that extends from the fuel tank is inserted may be formed on the rear floor panel, and a front end of the stiffener may extend to a position that overlaps with the piping insertion hole in a vehicle body forward/rearward direction.

In this case, when the impact load is input from the vehicle rearward direction, it is possible to prevent stress from concentrating around the piping insertion hole by the stiffener. Accordingly, it is possible to prevent excess deformation of the rear floor panel at input of the impact load.

The stiffener may include: a forward/rearward extension portion that extends substantially horizontally along the vehicle body forward/rearward direction; and an inclination portion that extends to be inclined downward toward a vehicle body forward side from a front end of the forward/rearward extension portion.

In this case, at input of the impact load from the vehicle rearward direction, when a forward movement load of the spare tire acts on a rear end of the forward/rearward extension portion of the stiffener, an open angle between the forward/rearward extension portion and the inclination portion is enlarged, and a rear end side of the stiffener is lifted upward. As a result, a front portion of the spare tire follows the lifting displacement of the stiffener and is displaced upward, and the movement of the spare tire in the fuel tank direction is prevented.

A stiffener reinforcement bead along an extension direction of the inclination portion may be formed on the inclination portion.

In this case, the rigidity of the inclination portion of the stiffener is enhanced by the stiffener reinforcement bead. Thereby, it becomes possible to enhance the bending rigidity of the inclination portion while avoiding the increase in the cross-section of the stiffener. Accordingly, when the present configuration is employed, it is possible to further reliably prevent the movement in the fuel tank direction of the spare tire at input of the impact load while preventing the increase in an occupied area by the stiffener.

The stiffener may be arranged further inward in a vehicle width direction than an outer end in the vehicle width direction of the tire storage area.

In this case, the stiffener is arranged in front of a region in which the spare tire is arranged in the tire storage area. Therefore, at input of the impact load from the vehicle rearward direction, the load of the spare tire that moves forward can be reliably received by the stiffener, and deformation of an upper region of the fuel tank in the vehicle body floor can prevented.

A cross member that extends along a vehicle width direction may be joined to an upper surface of the vehicle body floor at a forward position of the tire storage area, and the stiffener may be joined to a lower surface of the vehicle body floor at a position that intersects the cross member.

In this case, when the impact load is input to the stiffener from the vehicle rearward direction, the load is received by the cross member on the upper surface side of the vehicle body floor. Thereby, deformation of the vehicle body floor in the upper region of the fuel tank is further reliably prevented, and input of the impact load to the fuel tank is prevented.

A bulkhead member that reinforces, from an inside, a closed cross-section along the vehicle width direction formed of the vehicle body floor and the cross member may be attached to the closed cross-section at a position that intersects the stiffener, and an outer end in the vehicle width direction of the cross member may be joined to a reinforcement member that extends upward along a rear wheel house.

In this case, the portion of the cross-section of the cross member that intersects the stiffener is reinforced by the bulkhead member, and the outer end in the vehicle width direction of the cross member is supported by the reinforcement member. Thereby, the impact load that is input to the stiffener from the vehicle rearward direction can be efficiently transmitted to a vehicle body side portion via the cross member. As a result, at input of the impact load from the vehicle rearward direction, the load that is input to the stiffener can be received by a wide range of the vehicle body with high rigidity, and deformation of the upper region of the fuel tank in the vehicle body floor can be further reliably prevented.

An anchor bracket that supports a seat belt anchor may be attached to the cross member at a vehicle body forward side of a position that intersects the stiffener.

In this case, when a large load is input from the seat belt to the seat belt anchor at input of an impact load from the vehicle rearward direction, the load is supported by a portion of the cross member having an enhanced rigidity by the stiffener and the bulkhead member. Thereby, at input of the impact load from the vehicle rearward direction, large deformation of the upper region of the fuel tank in the vehicle body floor in response to a forward movement load of the spare tire and a pullout reaction force of the seat belt is prevented.

A floor reinforcement bead that extends along the vehicle body forward/rearward direction to a vicinity of a rear end of the stiffener may be formed on the vehicle body floor between a front edge of the tire storage area and a rear end position of the stiffener.

In this case, the rigidity (rigidity in the vehicle body forward/rearward direction) of a region of the vehicle body floor between the stiffener and the front edge of the tire storage area is enhanced by the floor reinforcement bead. Thereby, collapsed deformation of the region between the stiffener and the front edge of the tire storage area in response to a deformation load of the tire pan or a forward movement load of the spare tire at input of the impact load from the vehicle rearward direction is prevented. Further, since the floor reinforcement bead extends to the vicinity of the rear end of the stiffener, when a rear portion of the floor reinforcement bead receives a large load from the spare tire at input of the impact load from the vehicle rearward direction, the rear portion of the floor reinforcement bead is lifted upward using a front end side as a bend fulcrum point. Thereby, the front portion of the spare tire is guided by the floor reinforcement bead so as to smoothly stand upward. As a result, the movement of the spare tire in the fuel tank direction at input of the impact load from the vehicle rearward direction is prevented.

A step portion having an upper surface that is higher than a bottom wall of the tire storage area may be provided on a front edge of the tire storage area.

In this case, when the spare tire comes into contact with a rear end side of the step portion at input of the impact load from the vehicle rearward direction, the front edge of the tire storage area is deformed and bent such that a corner portion on the rear side of the step portion is lifted upward. As a result, a front portion of the spare tire that is to move forward is guided to an upward side by the step portion, and the movement of the spare tire in the fuel tank direction is prevented.

In the vehicle body rear portion structure according to an aspect of the present invention, the stiffener that extends along the vehicle body forward/rearward direction is attached to the vehicle body floor at the forward position of the tire pan, and the upper region of the fuel tank of the vehicle body floor is reinforced by the stiffener. Therefore, the vehicle body rear portion structure according to an aspect of the present invention is able to prevent the movement of the spare tire in the fuel tank direction by the stiffened portion by the stiffener at input of the impact load while being simple in structure and not occupying a large space.

DESCRIPTION OF EMBODIMENTS

Figure 1:
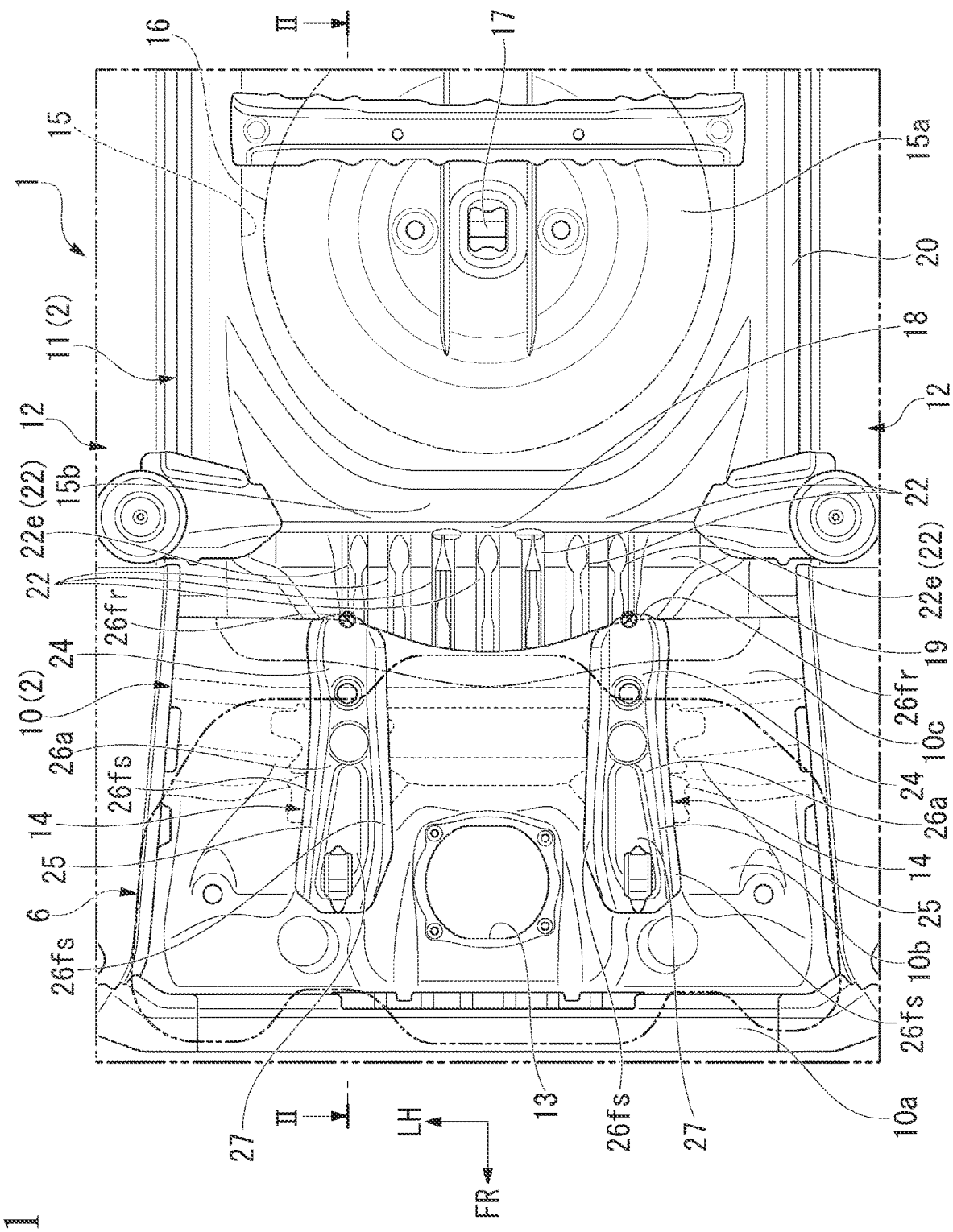
FIG. 1 is a bottom view of a rear portion of a vehicle according to an embodiment.

Hereinafter, an embodiment of the present invention will be described with reference to the drawings. An arrow FR that indicates a forward direction of a vehicle, an arrow UP that indicates an upward direction of the vehicle, and an arrow LH that indicates a leftward direction of the vehicle are shown at an appropriate position of the drawing.

Figure 2:
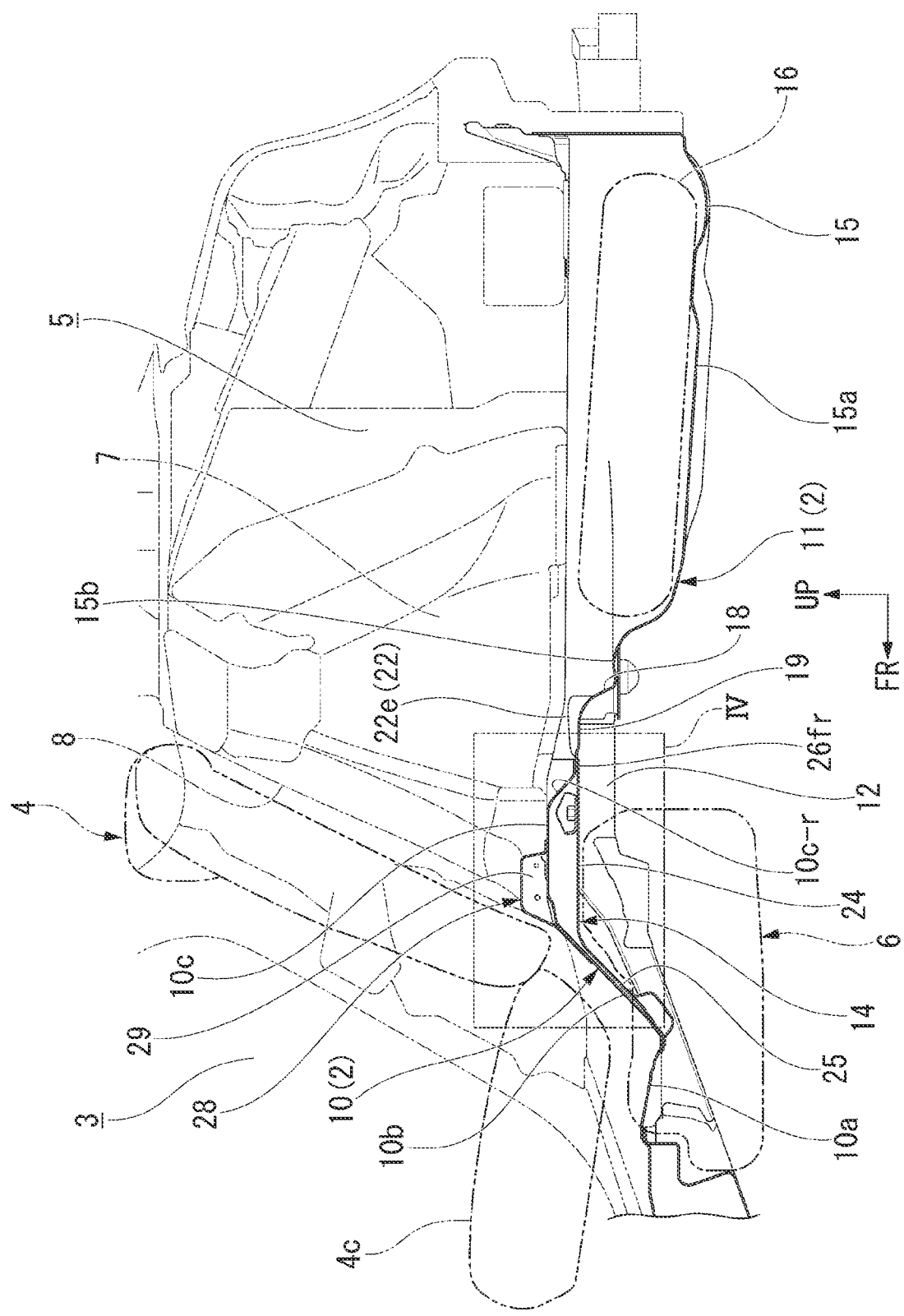
FIG. 2 is a cross-sectional view along a II-II line of FIG. 1.

FIG. 1 is a bottom view of a rear portion of a vehicle 1 according to the present embodiment. FIG. 2 is a cross-sectional view along a II-II line of FIG. 1. Further, FIG. 3 is a perspective view of a vehicle body floor 2 portion of the rear portion of the vehicle 1 when seen from an upper side.

The vehicle body floor 2 includes: a rear floor panel 10 arranged below an occupant room 3; and a tire pan 11 arranged below a load room 5 behind the occupant room 3. A rear seat 4 (occupant seat) is arranged above the rear floor panel 10. The rear floor panel 10 extends from a front portion of the tire pan 11 to a vehicle body forward side. A rear side frame 12 that extends substantially along a vehicle body forward/rearward direction is arranged on both right and left sides of the rear floor panel 10 and the tire pan 11. The rear floor panel 10 and the tire pan 11 are provided on the right and left rear side frames 12.

Figure 3:
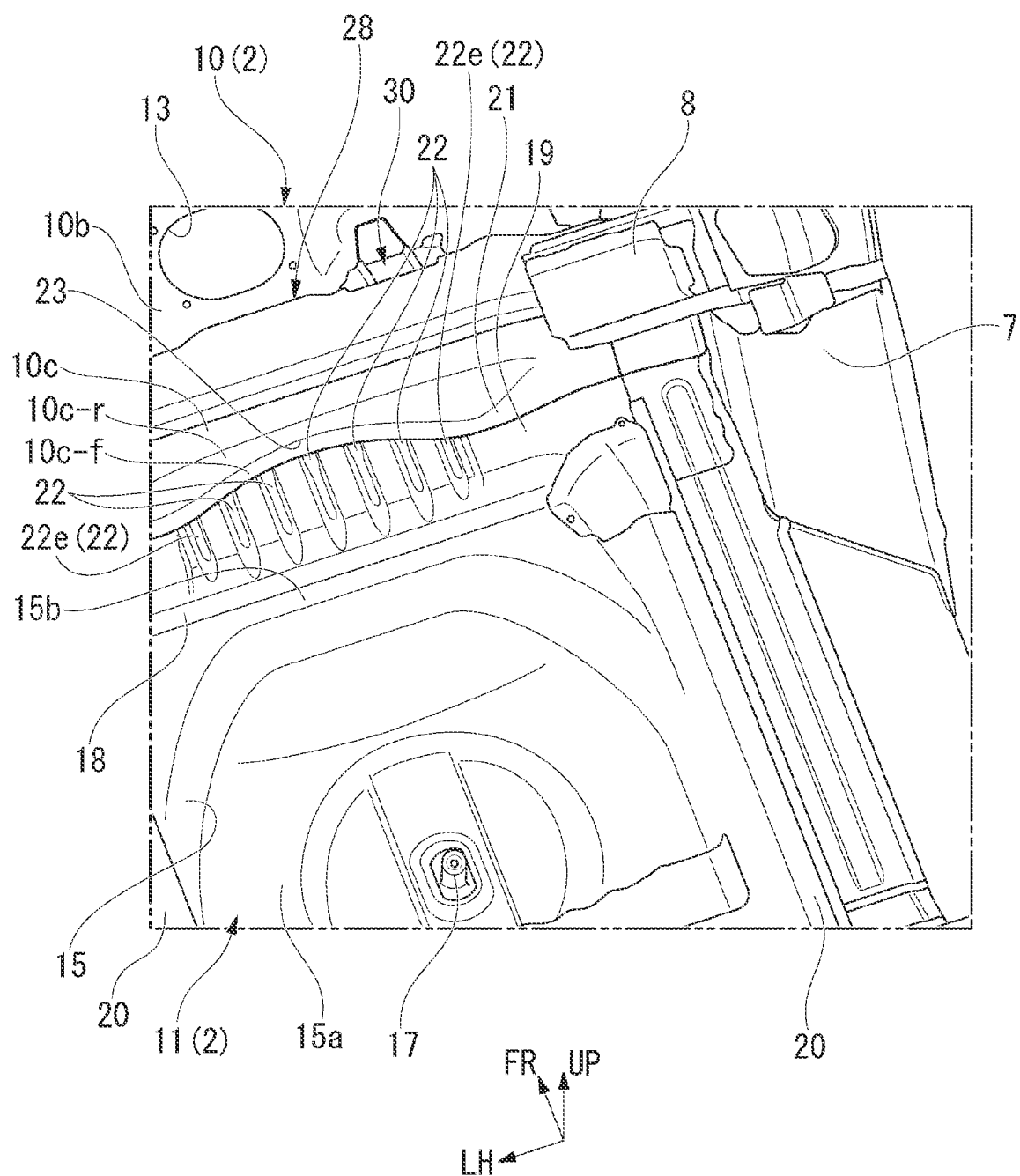
FIG. 3 is a perspective view of a vehicle body floor portion of the rear portion of the vehicle according to the embodiment when seen from an upper side.

Reference numeral 7 in FIG. 2 and FIG. 3 indicates a rear wheel house that covers a vehicle inside of a rear wheel (not shown), and reference numeral 8 indicates a reinforcement member that extends in an upward/downward direction along a vehicle inside surface of the rear wheel house 7. The reinforcement member 8 is joined to the vehicle inside surface of the rear wheel house 7 and forms a closed cross-section that extends in a vehicle upward/downward direction together with the rear wheel house 7. A lower end portion of the reinforcement member 8 is joined to a corresponding rear side frame 12 on right and left sides.

As shown in FIG. 2, the rear floor panel 10 includes a lower part 10a positioned below a seat cushion 4c of the rear seat 4, an inclination part 10b that extends to be inclined rearward and obliquely upward from a rear end portion of the lower part 10a, and a raised part 10c formed continuously in an upper end region of the inclination part 10b. In the raised part 10c, a raised shape having a substantially trapezoidal shape extends throughout substantially the entire region in the vehicle width direction.

As shown in FIG. 3, a rear wall 10c-r that is inclined toward a lower rear portion and a joint flange 10c-f that extends to bend to a vehicle rearward side from a lower end of the rear wall 10c-r are formed on a rear side of the raised part 10c. The joint flange 10c-f is joined to a front extension wall 19 described later of the tire pan 11. A curved surface 23 having a middle region in a vehicle width direction that is curved in a recess shape to a vehicle body forward side is provided on the rear wall 10c-r (a rear portion of the raised part 10c). The joint flange 10c-f positioned at a lower end of the curved surface 23 has a curved shape along the curved surface 23 in a top view.

The raised part 10c stands upward from a front portion of the front extension wall 19 described later of the tire pan 11 and extends substantially along the vehicle width direction.

A fuel tank 6 is arranged below a section that spans the lower part 10a, the inclination part 10b, and the raised part 10c. The fuel tank 6 is formed in an upper surface shape substantially along the shape of each lower surface of the lower part 10a, the inclination part 10b, and the raised part 10c. The fuel tank 6 extends to both right and left sides to sandwich a middle region in the vehicle width direction and is fixed to a lower portion of the rear floor panel 10 by a fastener (not shown). Thereby, the fuel tank 6 is supported by a lower surface on a front side of a tire storage area 15 described later of the vehicle body floor 2.

A piping insertion hole 13 is formed in a middle region in the vehicle width direction of the inclination part 10b of the rear floor panel 10. A fuel pipe (piping, not shown) that extends upward from an upper portion of the fuel tank 6 is inserted through the piping insertion hole 13. A pair of stiffeners 14 are arranged on a lower surface of the rear floor panel 10 at a further outward position in the vehicle width direction than the piping insertion hole 13. The stiffener 14 extends along the vehicle body forward/rearward direction and is joined to a lower surface of a region that ranges from the raised part 10c to a rear end of the lower part 10a. A front end of each stiffener 14 extends to a position that overlaps with the piping insertion hole 13 in the vehicle body forward/rearward direction. Further, a rear end of each stiffener 14 extends beyond a rear end position of the fuel tank 6 to a vehicle body rearward side. The stiffener 14 reinforces an upper region of the fuel tank 6 of the rear floor panel 10 (the vehicle body floor 2) at a forward position of the tire storage area 15 described later of the vehicle body floor 2. The detailed structure of the stiffener 14 will be described later in detail.

The tire pan 11 includes the tire storage area 15 having a substantially circular shape that is hollowed downward in a recess shape. A spare tire 16 is stored in the tire storage area 15. As shown in FIG. 2, a bottom wall 15a of the tire storage area 15 is inclined downward toward a vehicle body rearward side. A tire fixation portion 17 is arranged on substantially a middle of the bottom wall 15a of the tire storage area 15. A center part of the spare tire that is accommodated laterally in the tire storage area 15 is fixed to the tire fixation portion 17 by a fastener (not shown).

A step portion 15b that is higher by one step than the bottom wall 15a of the tire storage area 15 is provided on a front edge of the tire storage area 15 of the tire pan 11. A rise wall 18 that stands upward is provided on a front end of the step portion 15b.

The front extension wall 19 that extends forward substantially horizontally is provided on an upper end of the rise wall 18. The rise wall 18 extends substantially linearly in the vehicle width direction. However, the entire rise wall 18 does not stand vertically upward, and the rise wall 18 is inclined to a vehicle body forward side toward an upward direction. The rise wall 18 and the front extension wall 19 are continuous by a smooth circular arc.

Here, the tire fixation portion 17 in the tire storage area 15 is arranged on a further rearward side than the rise wall 18. Therefore, when an impact load is input from a vehicle rearward side, and the spare tire 16 fixed to the tire fixation portion 17 is pushed upward and forward along the inclined bottom wall 15a, a front portion of the spare tire 16 hits the vicinity of a corner portion on a rear end side of the step portion 15b, and the step portion 15b is bent and deformed such that the corner portion is lifted upward (refer to FIG. 7A). Then, when the spare tire 16 moves forward, the front portion of the spare tire 16 comes into contact with part of the deformed bent step portion 15b and the inclined rise wall 18 and is guided to stand upward (refer to FIG. 7B and FIG. 7C).

Further, a side extension wall 20 that is higher by one step than the bottom wall 15a of the tire storage area 15 is provided on right and left side edge portions of the tire storage area 15. The right and left side extension walls 20 are joined to right and left opposite rear side frames 12, respectively.

A rear end portion (the joint flange 10c-f of the raised part 10c) of the rear floor panel 10 is overlapped on an upper surface of a front end portion of the front extension wall 19 of the tire pan 11, and overlapped portions are joined together by welding or the like. Hereinafter, the portions that are joined together of the tire pan 11 and the rear floor panel 10 are referred to as a joint portion 21.

A plurality of floor reinforcement beads 22 that extend along the vehicle body forward/rearward direction are formed on the front extension wall 19 of the tire pan 11. The plurality of floor reinforcement beads 22 are arranged in a middle region in the vehicle width direction of the front extension wall 19 to be spaced apart from each other at a substantially equal interval in the vehicle width direction. In each floor reinforcement bead 22, an expansion shape that expands upward extends in the vehicle body forward/rearward direction.

Figure 4:
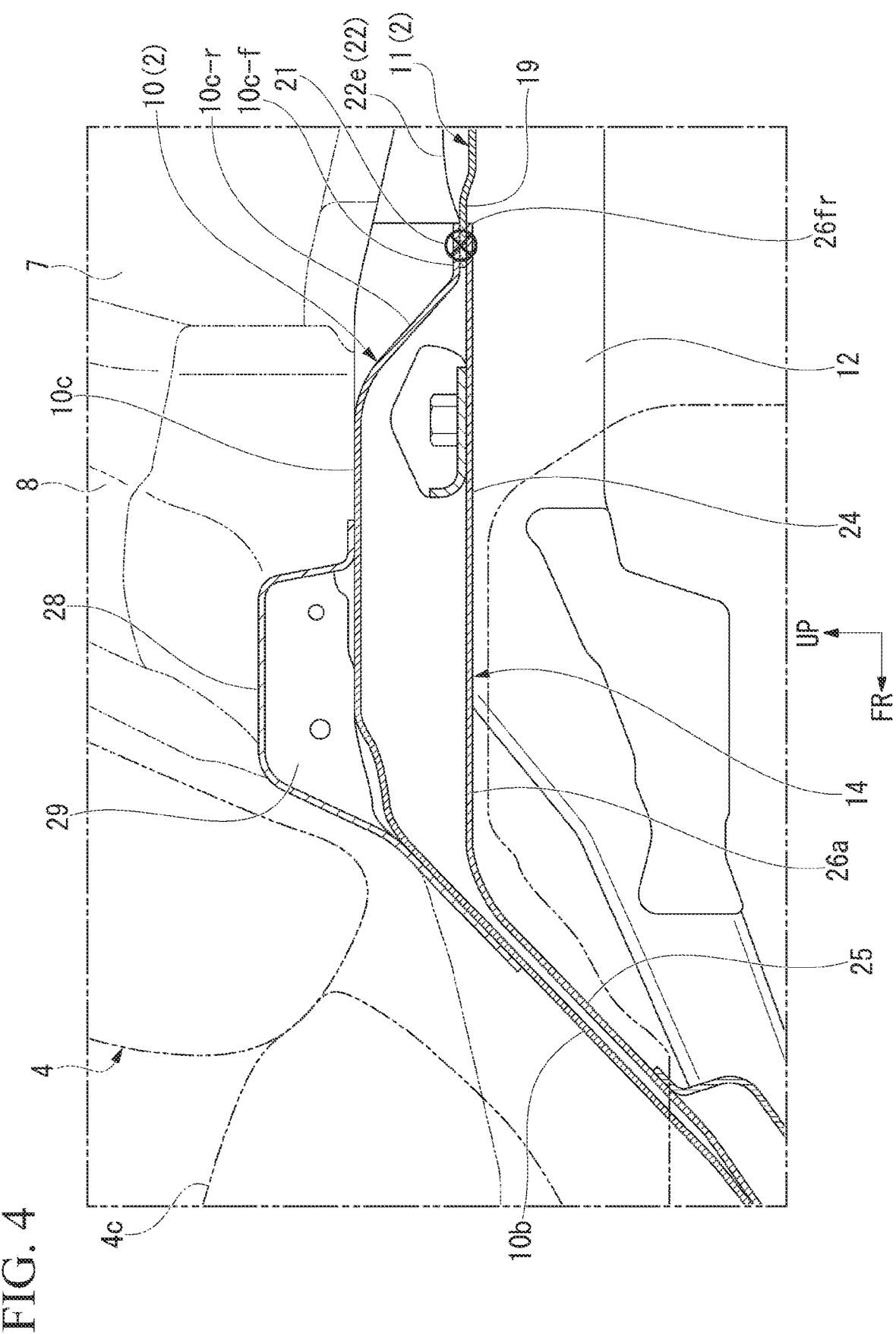
FIG. 4 is an enlarged view of a IV part of FIG. 2.
Figure 5:
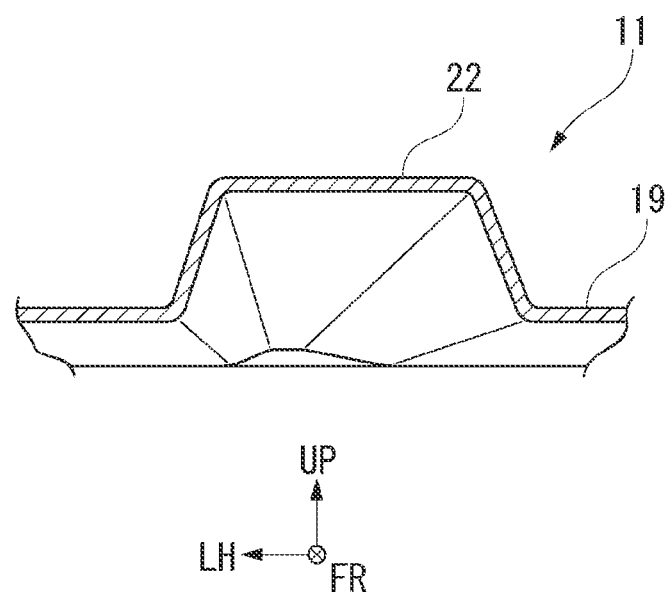
FIG. 5 is a partial cross-sectional perspective view of a floor reinforcement bead according to the embodiment.

FIG. 4 is an enlarged view of a IV part of FIG. 2. FIG. 5 is a partial cross-sectional perspective view of the floor reinforcement bead 22. More specifically, FIG. 5 is a perspective view in which the vicinity of a rear portion of the front extension wall 19 is cut along the vehicle width direction, and the front extension wall 19 is seen from the vehicle body rearward side with one floor reinforcement bead 22 as a center.

As shown in FIG. 4, FIG. 5 and the like, each floor reinforcement bead 22 is formed in a substantially trapezoidal shape in which a cross-section along the vehicle width direction spreads downward to widen toward the end. The cross-section of each floor reinforcement bead 22 is formed such that, except for the vicinity of the rear end, the width and the height in the vehicle width direction are gradually decreased toward the vehicle body forward side (such that the width and the height in the vehicle width direction are gradually increased toward the vehicle body rearward side). A front end portion of each floor reinforcement bead 22 extends to the vicinity of a lower end (joint flange 10c-f) on the rear side of the raised part 10c of the rear floor panel 10.

A rear end of each floor reinforcement bead 22 continues to a rear surface on an upper end side of the rise wall 18 while the width and the height in the vehicle width direction are gradually decreased toward the vehicle body rear side.

As shown in FIG. 3, since the middle region in the vehicle width direction of the rear lower end of the raised part 10c is a curved shape that is hollowed to the vehicle forward side, the extension length to the vehicle body forward side of each floor reinforcement bead 22 is longer as the floor reinforcement bead 22 is located further inward in the vehicle width direction. Accordingly, the floor reinforcement bead 22 arranged inward in the vehicle width direction is formed such that the length in the vehicle body forward/rearward direction is longer than that of the floor reinforcement bead 22 arranged outward in the vehicle width direction.

As shown in FIG. 1, right and left floor reinforcement beads 22e (floor reinforcement bead 22) that are located at an outermost position in the vehicle width direction are arranged so as to overlap (so as to align) substantially linearly in the vehicle body forward/rearward direction with the right and left stiffeners 14, respectively. The stiffener 14 is arranged on the vehicle body forward side, and the plurality of floor reinforcement beads 22e are arranged on the vehicle body rearward side such that the stiffener 14 and the plurality of floor reinforcement beads 22e interpose the rear wall 10c-r of the raised part 10c of the rear floor panel 10. More specifically, the right and left stiffeners 14 and the outermost floor reinforcement beads 22e in the vehicle width direction are arranged at front and rear positions of an outer end portion in the vehicle width direction of the curved surface 23 of the rear wall 10c-r. The rest of the floor reinforcement beads 22 are arranged at a rear portion in an inner region in the vehicle width direction of the curved surface 23 of the rear wall 10c-r. A front end portion of the rest of the floor reinforcement beads 22 is located at a further vehicle forward position than the rear end portions of the right and left stiffeners 14. That is, the front end portion of the rest of the floor reinforcement beads 22 is overlapped in the vehicle body forward/rearward direction with the rear end portions of the right and left stiffeners 14.

Further, the right and left floor reinforcement beads 22e that are located at the outermost position in the vehicle width direction are arranged at a position further inward in the vehicle width direction than right and left ends in the vehicle width direction of the tire storage area 15. Accordingly, all of the floor reinforcement beads 22 on the front extension wall 19 are positioned on a movement trajectory when the spare tire 16 in the tire storage area 15 moves forward.

Similar to the right and left floor reinforcement beads 22e that are located at the outermost position in the vehicle width direction, the right and left stiffeners 14 are arranged at a position further inward in the vehicle width direction than the right and left ends in the vehicle width direction of the tire storage area 15. Therefore, the right and left stiffeners 14 are positioned on a movement trajectory when the spare tire 16 moves forward.

As shown in FIG. 1 and FIG. 4, the stiffener 14 includes: a forward/rearward extension portion 24 that extends substantially horizontally along the vehicle body forward/rearward direction; and an inclination portion 25 that extends to be inclined downward from a front end of the forward/rearward extension portion 24 toward the vehicle body forward side. In the forward/rearward extension portion 24 and the inclination portion 25, a cross-sectional shape along the vehicle width direction is a substantially hat shape. That is, in the forward/rearward extension portion 24 and the inclination portion 25, a side flange portion 26fs that projects outward in the vehicle width direction is provided on right and left edges of a recess shape portion 26a that is hollowed downward. Further, a rear flange portion 26fr that extends from a bottom wall of the recess shape portion 26a toward the vehicle body rearward side is provided on a rear end of the forward/rearward extension portion 24.

In each stiffener 14, the forward/rearward extension portion 24 is joined to a lower surface of the raised part 10c of the rear floor panel 10, and the inclination portion 25 is joined to a lower surface of the inclination part 10b of the rear floor panel 10 and a rear end lower surface of the lower part 10a. The forward/rearward extension portion 24 and the inclination portion 25 are joined to the lower surface of the rear floor panel 10 at the side flange portion 26fs and the rear flange portion 26fr. Thereby, the stiffener 14 forms a closed cross-section that is continuous in the vehicle body forward/rearward direction with the rear floor panel 10. The closed cross-section bends along the forward/rearward extension portion 24 and the inclination portion 25 of the stiffener 14, and a rear end butts the rear wall 10c-r of the raised part 10c.

Here, the floor reinforcement bead 22e that is located at the outermost position in the vehicle width direction extends to the vicinity of the rear end of each of the right and left stiffeners 14 so as to interpose the rear wall 10c-r of the raised part 10c. Each floor reinforcement bead 22e having the front end that extends to the vicinity of the rear end of the stiffener 14 is aligned so as to overlap substantially linearly in the forward/rearward direction with the stiffener 14 on the forward side. Further, the forward/rearward extension portion 24 of each stiffener 14 extends substantially horizontally at a height at which at least part of the forward/rearward extension portion 24 is overlapped in the upward/downward direction with the floor reinforcement bead 22 arranged on the rearward side. Here, the front end of the tire pan 11 and the rear end of the rear floor panel 10 are joined together at the joint portion 21 as described above. As shown in FIG. 4, the rear flange portion 26fr of the rear end of each stiffener 14 is inserted in a space of the joint portion 21 between the rear floor panel 10 and the tire pan 11 and, in that state, is welded and fixed with the tire pan 11 and the rear floor panel 10 in an overlapped three-layer state. That is, the rear end of each stiffener 14 is joined to the joint portion 21 of the tire pan 11 and the rear floor panel.

Further, as shown in FIG. 1, a stiffener reinforcement bead 27 that is hollowed upward is provided on a bottom wall of the recess shape portion 26a of the inclination portion 25 of each stiffener 14. The stiffener reinforcement bead 27 extends along the vehicle body forward/rearward direction (along the extension direction of the inclination portion 25) and enhances the rigidity of the inclination portion 25 of the stiffener 14.

Figure 6:
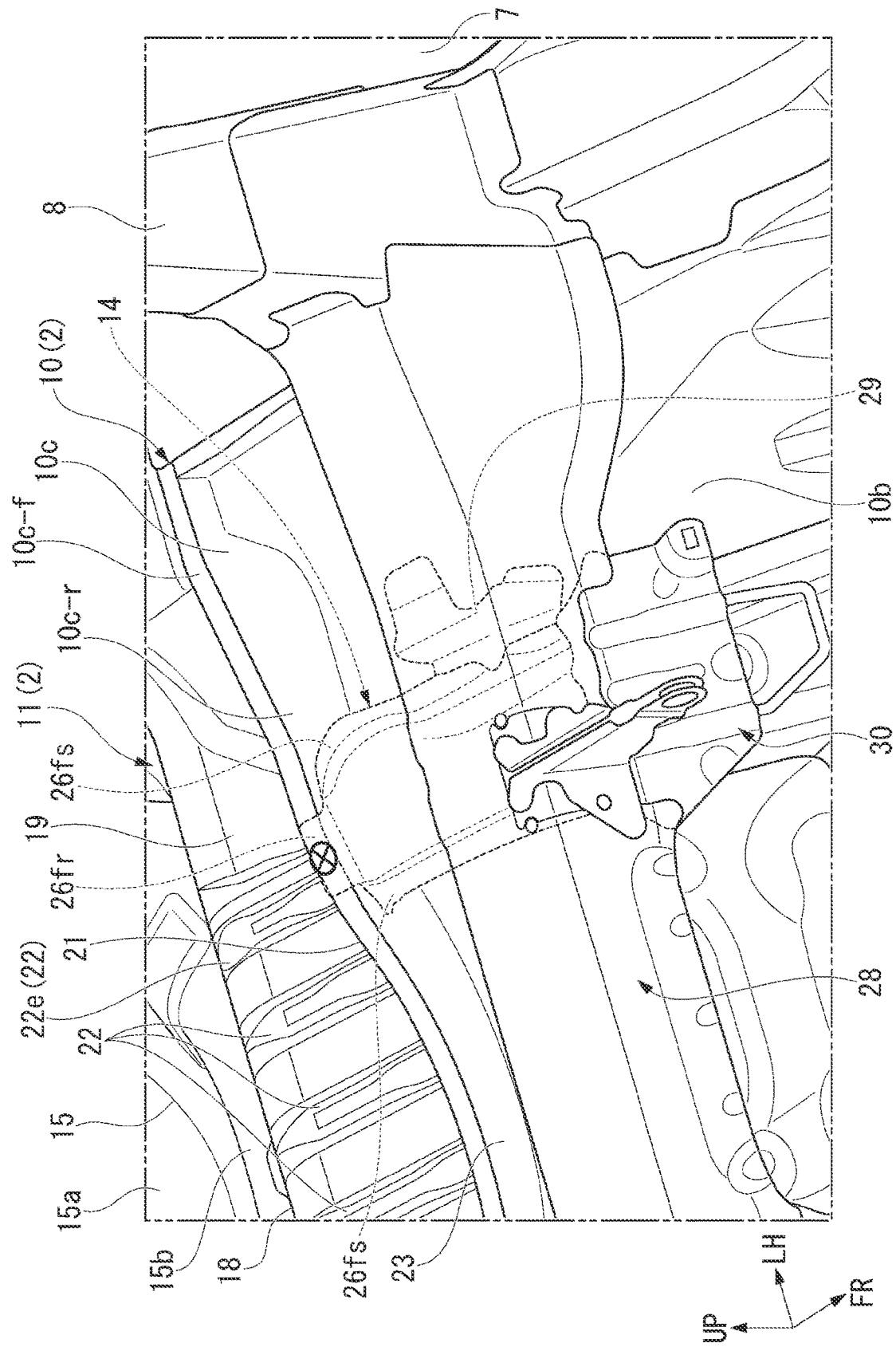
FIG. 6 is a perspective view of the rear portion of the vehicle according to the embodiment when seen from the upper side.

FIG. 6 is a perspective view of the rear portion (vehicle body floor 2) of the vehicle 1 when seen from a forward upward side.

As shown in FIG. 2 to FIG. 4 and FIG. 6, a cross member 28 that extends along the vehicle width direction is joined to an upper surface of the raised part 10c (forward position of the tire storage area 15) of the rear floor panel 10. The cross member 28 is formed in a cross-sectional shape of a substantially hat shape, and front and rear flange portions are joined to an upper surface of the raised part 10c. Thereby, the cross-member 28 forms a closed cross-section along the vehicle width direction together with the raised part 10c (vehicle body floor 2). An outer end in the vehicle width direction of the cross member 28 is joined to the reinforcement member 8 that extends upward along the rear wheel house 7.

As shown in FIG. 6, each of the right and left stiffeners 14 is joined to a lower surface of the rear floor panel 10 (vehicle body floor 2) at a position that intersects the cross member 28. A bulkhead member 29 (bulkhead) that reinforces, from the inside, a closed cross-section formed of the raised part 10c (vehicle body floor 2) and the cross member 28 is attached to the closed cross-section at a position that intersects the stiffener 14.

Further, as shown in FIG. 6, an anchor bracket 30 that supports a seat belt anchor used for the rear seat 4 is attached to the cross member 28 at a vehicle body forward side of a position that intersects each stiffener 14.

Figure 7A:
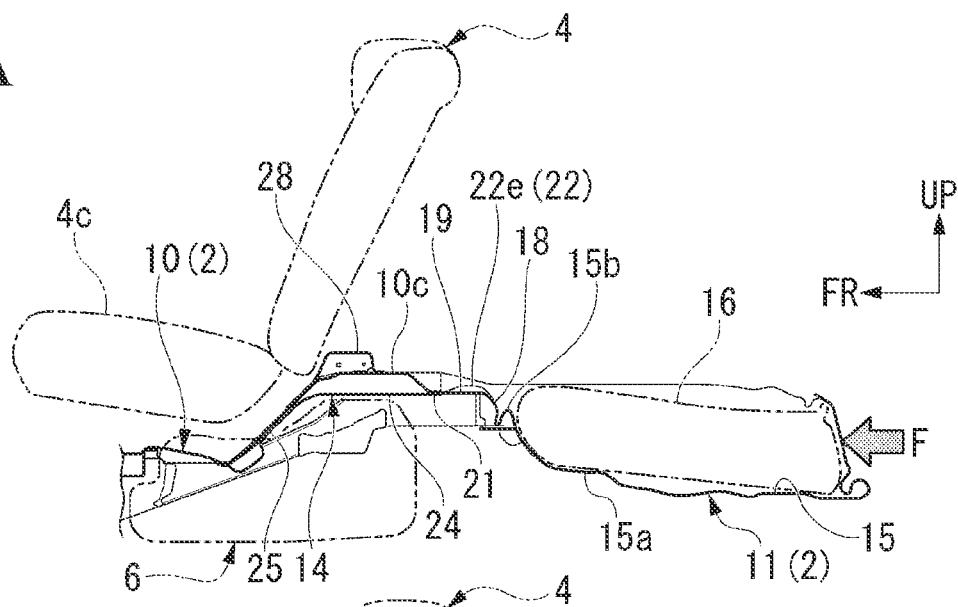
FIG. 7A is a schematic cross-sectional view showing deformation behavior of the rear portion of the vehicle according to the embodiment.
Figure 7B:
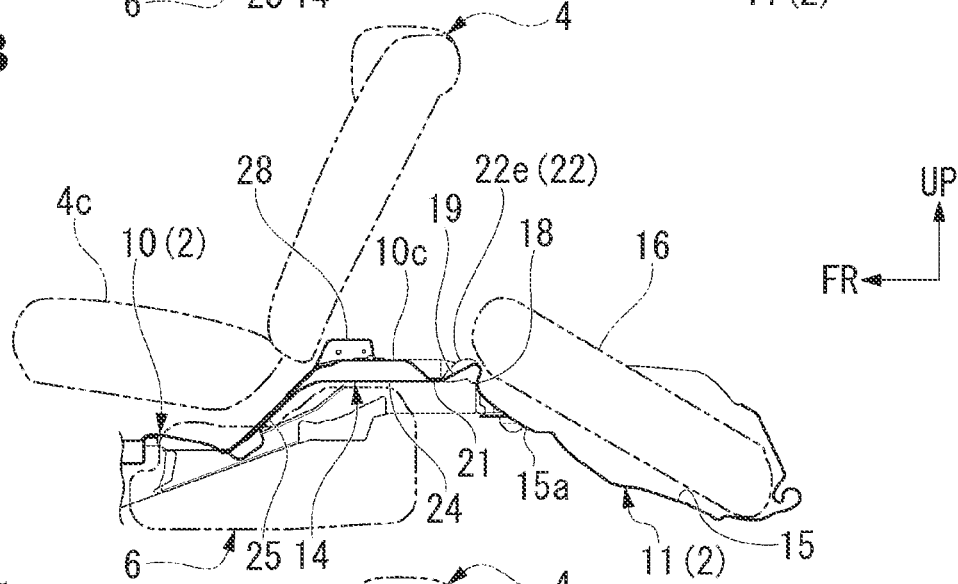
FIG. 7B is a schematic cross-sectional view showing the deformation behavior of the rear portion of the vehicle according to the embodiment.
Figure 7C:
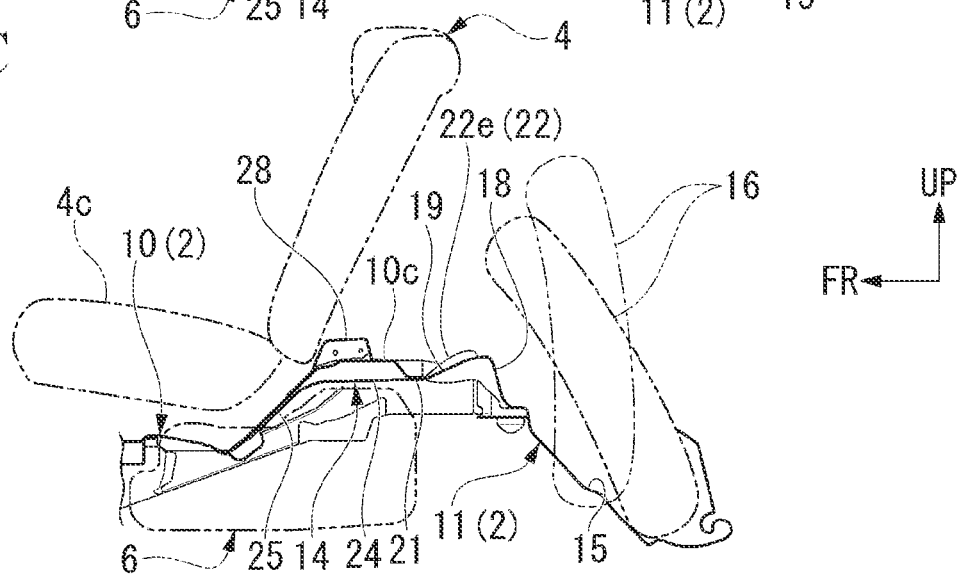
FIG. 7C is a schematic cross-sectional view showing the deformation behavior of the rear portion of the vehicle according to the embodiment.

FIGS. 7A to 7C are schematic cross-sectional views showing the deformation behavior of the rear portion of the vehicle 1 when an impact load is input from a vehicle rearward direction in order of FIG. 7A, FIG. 7B, and FIG. 7C. Hereinafter, the deformation behavior of the vehicle body rear portion at input of the impact load is described with reference to FIGS. 7A to 7C.

<Deformation Behavior of Vehicle Body Rear Portion>

As shown in FIG. 7A, when a large impact load F is input from a rearward direction of the tire pan 11, the tire storage area 15 of the tire pan 11 is deformed and collapsed in the vehicle body forward/rearward direction, and the spare tire 16 in the tire storage area 15 is pushed forward. Thereby, the front portion of the spare tire 16 comes into contact with the rear surface of the step portion 15b of a front edge of the tire storage area 15, and the step portion 15b is deformed and bent such that the corner portion on the rear side of the step portion 15b is lifted upward. Then, when the spare tire 16 is to move further forward, the front portion of the spare tire 16 comes into contact with the collapsed deformed step portion 15b and the forward inclined rise wall 18, and the spare tire 16 is guided such that the front portion of the spare tire 16 is gradually lifted along with the collapsed deformation of the tire storage area 15.

When the input of the impact load F further proceeds from this state, as shown in FIG. 7B, the front portion of the spare tire 16 comes into contact with the vicinity of the rear end of the front extension wall 19, and the impact load F is input to the rear portion of the front extension wall 19 via the spare tire 16. At this time, since the middle region in the vehicle width direction of the front extension wall 19 is reinforced by the plurality of floor reinforcement beads 22, the front extension wall 19 is displaced such that the rear end side is lifted upward using the vicinity of the joint portion 21 with the rear floor panel 10 on the front end side as a bend start point. As a result, the spare tire 16 is guided such that the front portion is lifted further upward.

At this time, when a larger load is input to the vicinity of the rear end of the front extension wall 19 via the spare tire 16, a deformation load is also input to the rear region of the rear floor panel 10. A pair of stiffeners 14 are arranged along the vehicle body forward/rearward direction in the rear region of the rear floor panel 10, and each stiffener 14 has a structure that includes the forward/rearward extension portion 24 and the inclination portion 25. Therefore, as shown in FIG. 7C, the rear end side of the forward/rearward extension portion 24 is lifted such that a bend angle between the inclination portion 25 and the forward/rearward extension portion 24 of each stiffener 14 is enlarged, and the rear end of the front extension wall 19 is lifted further upward. As a result, the spare tire 16 is guided such that the front portion is lifted further upward and stands.

As described above, in the vehicle 1 of the present embodiment, at input of the impact load F from the vehicle rearward direction, the energy of the impact load is absorbed by the deformation of the vehicle rear portion, and in that process, the spare tire 16 exhibits a behavior of standing upward. The spare tire 16 stands upward, and thereby, the displacement to the fuel tank 6 or the rear seat 4 direction is prevented.

Effects of Embodiment

In the vehicle body rear portion structure of the present embodiment, the stiffener 14 that extends along the vehicle body forward/rearward direction is attached to the vehicle body floor 2 at the forward position of the tire pan 11, and the rigidity of the upper region of the fuel tank 6 of the vehicle body floor 2 is enhanced by the stiffener 14. Therefore, when the impact load is input from the vehicle rearward direction, deformation of the upper region of the fuel tank 6 of the vehicle body floor 2 is prevented, and the movement in the fuel tank 6 direction of the spare tire 16 is also prevented. Accordingly, the vehicle body rear portion structure of the present embodiment is able to prevent the movement of the spare tire 16 in the fuel tank 6 direction by the stiffened portion by the stiffener 14 at input of the impact load while being simple in structure and not occupying a large space.

Further, in the vehicle body rear portion structure of the present embodiment, since the rear end of the stiffener 14 extends to a vehicle body rearward position beyond the rear end of the fuel tank 6, when the impact load is input from the vehicle rearward direction, deformation of the vehicle body floor 2 at the rear end upper portion of the fuel tank 6 can be prevented by the stiffener 14. Accordingly, when the vehicle body rear portion structure of the present embodiment is employed, it is possible to further reliably prevent a load from acting on the fuel tank 6 at input of the impact load from the vehicle rearward direction.

Further, in the vehicle body rear portion structure of the present embodiment, since the rear end of the stiffener 14 is joined to the joint portion 21 of the tire pan 11 and the rear floor panel 10, the rigidity of the joint portion 21 of the tire pan 11 and the rear floor panel 10 can be enhanced by the stiffener 14, and the impact load that is input through the tire pan 11 can be dispersed to the stiffener 14. Accordingly, when the vehicle body rear portion structure of the present embodiment is employed, it is possible to prevent concentration of stress on the joint portion 21 of the tire pan 11 and the rear floor panel 10 when the impact load is input from the vehicle rearward direction and prevent forward displacement of the tire pan 11 due to deformation of the joint portion 21.

In the present embodiment, the vehicle body floor 2 is constituted of the rear floor panel 10 and the tire pan 11; however, the vehicle body floor 2 may be constituted of a single panel material including the tire storage area 15. Further, the vehicle body floor 2 may be constituted of three or more panel materials.

Further, in the vehicle body rear portion structure of the present embodiment, the piping insertion hole 13 is provided on the rear floor panel 10, and the front end of the stiffener 14 extends to a position that overlaps with the piping insertion hole 13 of the rear floor panel 10 in the vehicle body forward/rearward direction. Therefore, when the impact load is input from the vehicle rearward direction, it is possible to prevent stress from concentrating around the piping insertion hole 13 of the rear floor panel 10 by the stiffener 14. Accordingly, when the present configuration is employed, it is possible to further prevent deformation of the rear floor panel 10 at input of the impact load and protect the fuel tank 6.

Further, in the vehicle body rear portion structure of the present embodiment, the stiffener includes: the forward/rearward extension portion 24 that extends substantially horizontally along the vehicle body forward/rearward direction; and the inclination portion 25 that is inclined forward and downward from the front end of the forward/rearward extension portion 24. Therefore, at input of the impact load, when a large forward movement load of the spare tire 16 acts on the rear end of the forward/rearward extension portion 24 of the stiffener 14, the open angle between the forward/rearward extension portion 24 and the inclination portion 25 is enlarged, and the rear end side of the stiffener 14 is lifted upward.

Then, when the rear end side of the stiffener 14 is lifted upward in this way, the front portion of the spare tire is pushed further upward. Accordingly, when the present configuration is employed, it is possible to further reliably prevent the movement of the spare tire 16 in the fuel tank 6 direction at input of the impact load. Further, in the vehicle body rear portion structure of the present embodiment, the stiffener reinforcement bead 27 along the extension direction of the inclination portion 25 is formed on the inclination portion 25 of the stiffener 14. Therefore, it is possible to enhance the bending rigidity of the inclination portion 25 while avoiding the increase in the cross-section of the stiffener 14. Accordingly, when the present configuration is employed, it is possible to further reliably prevent the movement in the fuel tank 6 direction of the spare tire 16 at input of the impact load while preventing the increase in the occupied area by the stiffener 14.

Further, in the vehicle body rear portion structure of the present embodiment, the stiffener 14 is arranged further inward in the vehicle width direction than the outer end in the vehicle width direction of the tire storage area 15 of the tire pan 11. Thereby, when the spare tire 16 is stored in the tire storage area 15, the stiffener 14 is located in a region in which the spare tire 16 is projected forward. Therefore, at input of the impact load from the vehicle rearward direction, the load of the spare tire 16 that moves forward can be reliably received by the stiffener 14. Accordingly, when the present configuration is employed, the movement of the spare tire 16 in the fuel tank 6 direction at input of the impact load can be further reliably prevented by the stiffener 14.

Further, in the vehicle body rear portion structure of the present embodiment, the cross member 28 that extends along the vehicle width direction is joined to the upper surface of the vehicle body floor 2 at the forward position of the tire storage area 15, and the stiffener 14 is joined to the lower surface of the vehicle body floor 2 at a position that intersects the cross member 28. Therefore, when the impact load is input to the stiffener 14 from the vehicle rearward direction, the load is received by the cross member 28 on the upper surface side of the vehicle body floor 2. Accordingly, when the vehicle body rear portion structure of the present embodiment is employed, deformation of the vehicle body floor 2 in the upper region of the fuel tank 6 is reliably regulated, and input of the impact load to the fuel tank 6 is further prevented.

Further, in the vehicle body rear portion structure of the present embodiment, the bulkhead member 29 that reinforces, from the inside, the closed cross-section along the vehicle width direction formed of the vehicle body floor 2 and the cross member 28 is attached to the closed cross-section at a position that intersects the stiffener 14. Therefore, the rigidity of the cross-section at a positon that intersects the stiffener 14 in the closed cross-section formed of the vehicle body floor 2 and the cross member 28 can be efficiently enhanced by the bulkhead member 29. Further, in the vehicle body rear portion structure of the present embodiment, the outer end in the vehicle width direction of the cross member 28 is joined to the reinforcement member 8 that extends upward along the rear wheel house 7. Therefore, the impact load that is input to the stiffener 14 from the vehicle rearward direction can be efficiently transmitted to the vehicle body side portion via the cross member 28. Accordingly, when the present configuration is employed, the load that is input to the stiffener 14 can be received with high rigidity, and deformation of the upper region of the fuel tank 6 in the vehicle body floor 2 can be further reliably prevented.

Further, in the vehicle body rear portion structure of the present embodiment, the anchor bracket 30 is attached to the cross member 28 at the vehicle body forward side of a position that intersects the stiffener 14, and the seat belt anchor of the rear seat 4 is supported by the anchor bracket 30. Therefore, when a large load is input from the seat belt to the seat belt anchor at input of an impact load from the vehicle rearward direction, the load is supported by the portion of the cross member 28 having an enhanced rigidity by the stiffener 14 and the bulkhead member 29. Accordingly, when the present configuration is employed, at input of the impact load, deformation of the upper region of the fuel tank 6 in the vehicle body floor 2 in response to a large load that is input from the seat belt can be prevented.

Further, in the vehicle body rear portion structure of the present embodiment, the floor reinforcement bead 22 is provided on the vehicle body floor 2 between the front edge of the tire storage area 15 and the rear end position of the stiffener 14, and the floor reinforcement bead 22 extends along the vehicle body forward/rearward direction to the vicinity of the rear end of the stiffener 14. Therefore, the rigidity of the region of the vehicle body floor 2 between the front edge of the tire storage area 15 and the rear end position of the stiffener 14 is enhanced by the floor reinforcement bead 22. Thereby, collapsed deformation of the region between the stiffener 14 and the front edge of the tire storage area 15 in response to a deformation load of the tire pan 11 or a forward movement load of the spare tire 16 at input of the impact load from the vehicle rearward direction can be prevented.

Further, in the vehicle body rear portion structure of the present embodiment, since the floor reinforcement bead 22 extends to the vicinity of the rear end of the stiffener 14, when the rear portion of the floor reinforcement bead 22 receives a large load from the spare tire 16 at input of the impact load from the vehicle rearward direction, the rear portion of the floor reinforcement bead 22 is lifted upward using the front end side as a bend fulcrum point. At this time, the front portion of the spare tire 16 is guided so as to stand upward by the behavior of the floor reinforcement bead 22. Accordingly, when the present configuration is employed, the movement of the spare tire 16 in the fuel tank 6 direction at input of the impact load from the vehicle rearward direction can be further prevented.

Further, in the vehicle body rear portion structure of the present embodiment, the step portion 15b having an upper surface that is higher than the bottom wall 15a of the tire storage area 15 is provided on the front edge of the tire storage area 15 of the tire pan 11. Therefore, when the spare tire 16 comes into contact with the rear end side of the step portion 15b at input of the impact load from the vehicle rearward direction, the front edge of the tire storage area 15 is deformed and bent such that the corner portion on the rear side of the step portion 15b is lifted upward. Thereby, at input of the impact load from the vehicle rearward direction, the front portion of the spare tire 16 that is to move forward is guided to the upward side by the step portion 15b, and it is possible to displace the spare tire 16 so as to stand. Accordingly, when the present configuration is employed, at input of the impact load from the vehicle rearward direction, the movement of the spare tire 16 in the fuel tank 6 direction can be prevented.

The present invention is not limited to the embodiment described above, and various design changes can be made without departing from the scope of the invention.

What is claimed is:

1. A vehicle body rear portion structure, comprising:
   a vehicle body floor having a tire storage area that is hollowed downward in a recess shape; and
   a fuel tank that is supported by a lower surface of the vehicle body floor on a forward side of the tire storage area,
   wherein a stiffener that extends along a vehicle body forward/rearward direction and reinforces an upper region of the fuel tank of the vehicle body floor is attached to the vehicle body floor at a forward position of the tire storage area, and
   a rear end of the stiffener extends to a vehicle body rearward position beyond a rear end of the fuel tank.

2. The vehicle body rear portion structure according to claim 1,
   wherein the vehicle body floor comprises:
      a tire pan having the tire storage area, and
      a rear floor panel that extends forward from a front portion of the tire pan,
   wherein a front end of the tire pan and a rear end of the rear floor panel are joined to each other, and
   wherein the rear end of the stiffener is joined to a joint portion of the tire pan and the rear floor panel.

3. The vehicle body rear portion structure according to claim 2,
   wherein a piping insertion hole through which a piping that extends from the fuel tank is inserted is formed on the rear floor panel, and
   wherein a front end of the stiffener extends to a position that overlaps with the piping insertion hole in a vehicle body forward/rearward direction.

4. The vehicle body rear portion structure according to claim 1,
   wherein the stiffener comprises:
      a forward/rearward extension portion that extends substantially horizontally along the vehicle body forward/rearward direction, and
      an inclination portion that extends to be inclined downward toward a vehicle body forward side from a front end of the forward/rearward extension portion.

5. The vehicle body rear portion structure according to claim 4,
   wherein a stiffener reinforcement bead along an extension direction of the inclination portion is formed on the inclination portion.

6. The vehicle body rear portion structure according to claim 1,
   wherein the stiffener is arranged further inward in a vehicle width direction than an outer end in the vehicle width direction of the tire storage area.

7. The vehicle body rear portion structure according to claim 1,
   wherein a cross member that extends along a vehicle width direction is joined to an upper surface of the vehicle body floor at a forward position of the tire storage area, and
   wherein the stiffener is joined to a lower surface of the vehicle body floor at a position that intersects the cross member.

8. The vehicle body rear portion structure according to claim 7,
   wherein a bulkhead member that reinforces, from an inside, a closed cross-section along the vehicle width direction formed of the vehicle body floor and the cross member is attached to the closed cross-section at a position that intersects the stiffener, and wherein an outer end in the vehicle width direction of the cross member is joined to a reinforcement member that extends upward along a rear wheel house.

9. The vehicle body rear portion structure according to claim 1, wherein a floor reinforcement bead that extends along the vehicle body forward/rearward direction to a vicinity of a rear end of the stiffener is formed on the vehicle body floor between a front edge of the tire storage area and a rear end position of the stiffener.

10. The vehicle body rear portion structure according to claim 9, wherein a step portion having an upper surface that is higher than a bottom wall of the tire storage area is provided on a front edge of the tire storage area.

11. A vehicle body rear portion structure, comprising:

a vehicle body floor having a tire storage area that is hollowed downward in a recess shape; and a fuel tank that is supported by a lower surface of the vehicle body floor on a forward side of the tire storage area, wherein a stiffener that extends along a vehicle body forward/rearward direction and reinforces an upper region of the fuel tank of the vehicle body floor is attached to the vehicle body floor at a forward position of the tire storage area, wherein a cross member that extends along a vehicle width direction is joined to an upper surface of the vehicle body floor at a forward position of the tire storage area, wherein the stiffener is joined to a lower surface of the vehicle body floor at a position that intersects the cross member, wherein a bulkhead member that reinforces, from an inside, a closed cross-section along the vehicle width direction formed of the vehicle body floor and the cross member is attached to the closed cross-section at a position that intersects the stiffener, wherein an outer end in the vehicle width direction of the cross member is joined to a reinforcement member that extends upward along a rear wheel house, and wherein an anchor bracket that supports a seat belt anchor is attached to the cross member at a vehicle body forward side of a position that intersects the stiffener.

* * * * *